United States Patent
Burchell et al.

(10) Patent No.: US 6,475,411 B1
(45) Date of Patent: Nov. 5, 2002

(54) METHOD OF MAKING IMPROVED GAS STORAGE CARBON WITH ENHANCED THERMAL CONDUCTIVITY

(75) Inventors: Timothy D. Burchell, Oak Ridge, TN (US); Michael R. Rogers, Knoxville, TN (US)

(73) Assignee: Ut-Battelle, LLC, Oak Ridge, TN (US)

(*) Notice: Subject to any disclaimer, the term of this patent is extended or adjusted under 35 U.S.C. 154(b) by 151 days.

(21) Appl. No.: 09/626,060

(22) Filed: Jul. 26, 2000

Related U.S. Application Data

(63) Continuation-in-part of application No. 09/609,338, filed on Jul. 5, 2000, which is a continuation-in-part of application No. 09/151,920, filed on Sep. 11, 1998, now Pat. No. 6,090,477.
(60) Provisional application No. 60/203,211, filed on May 11, 2000.

(51) Int. Cl.⁷ .................. B29C 41/16; B29C 41/50; B29C 67/20; C01B 31/10
(52) U.S. Cl. .................. 264/29.6; 264/29.7; 264/87; 264/140; 502/416
(58) Field of Search .................. 264/29.6, 29.7, 264/87, 140; 502/416

(56) References Cited

U.S. PATENT DOCUMENTS

| | | | |
|---|---|---|---|
| 5,071,820 A | 12/1991 | Quinn et al. | |
| 5,094,736 A | 3/1992 | Greenbank | |
| 5,102,855 A | 4/1992 | Greinke et al. | |
| 5,292,706 A | 3/1994 | Chang et al. | |
| 5,292,707 A | 3/1994 | Aparicio et al. | |
| 5,372,619 A | 12/1994 | Greinke et al. | |
| 5,416,056 A | 5/1995 | Baker | |
| 5,461,023 A | 10/1995 | Chang et al. | |
| 5,614,460 A | 3/1997 | Schwarz et al. | |
| 5,626,637 A | 5/1997 | Baker | |
| 5,639,707 A | 6/1997 | Lewis et al. | |
| 5,710,092 A | 1/1998 | Baker | |
| 5,837,741 A | 11/1998 | Schwarz et al. | |
| 5,912,424 A | 6/1999 | Judkins et al. | |
| 5,965,483 A | 10/1999 | Baker | |
| 5,972,253 A | * 10/1999 | Kimber | 264/29.7 |
| 6,030,698 A | 2/2000 | Burchell et al. | |
| 6,090,477 A | 6/2000 | Burchell et al. | |
| 6,258,300 B1 | * 7/2001 | Burchell et al. | 264/29.6 |

OTHER PUBLICATIONS

Cook, T. L. et al "Adsorbent Storage for Natural Gas Vehicles," Chap.9, pp. 269–302 in *Carbon Materials for Advanced Technologies*, T. D. Burchell, Ed., Pub. 1999, Pergamon Press, Oxford, UK.

Matranga, K. R. et al "Storage of Natural Gas by Adsorption on Activated Carbon," *Chemical Engineering Science*, vol. 47, #7, pp. 1569–1579, 1992.

Tan, Z. et al "Selective Adsorption of Simple Mixtures in Silt Pores: A Model of Methane–Ethane Mixtures in Carbon," *Journal of Phys. Chem.*, #96, pp. 845–854, 1992.

Burchell, T. D. et al "A Novel Process & Material for the Separation of Carbon Dioxide & Hydrogen Sulfide Gas Mixtures," *Carbon* vol. 35, No. 9, pp 1279–1294, 1997.

* cited by examiner

Primary Examiner—Leo B. Tentoni
(74) *Attorney, Agent, or Firm*—Kirk A. Wilson

(57) ABSTRACT

A method of making an adsorbent carbon fiber based monolith having improved methane gas storage capabilities is disclosed. Additionally, the monolithic nature of the storage carbon allows it to exhibit greater thermal conductivity than conventional granular activated carbon or powdered activated carbon storage beds. The storage of methane gas is achieved through the process of physical adsorption in the micropores that are developed in the structure of the adsorbent monolith. The disclosed monolith is capable of storing greater than 150 V/V of methane [i.e., >150 STP (101.325 KPa, 298K) volumes of methane per unit volume of storage vessel internal volume] at a pressure of 3.5 MPa (500 psi).

16 Claims, 8 Drawing Sheets

METHOD OF MAKING IMPROVED GAS STORAGE CARBON WITH ENHANCED THERMAL CONDUCTIVITY

This application is a continuation-in-part of U.S. patent application Ser. No. 09/609,338 filed on Jul. 5, 2000, which is a continuation-in-part of U.S. patent application Ser. No. 09/151,920 filed on Sep. 11, 1998, now U.S. Pat. No. 6,090,477, hereby incorporated herein by reference. This application also claims the benefit of U.S. Provisional Patent Application No. 60/203,211, filed May 11, 2000, hereby incorporated herein by reference.

STATEMENT REGARDING FEDERAL SPONSORSHIP

This invention was made with Government support under contract no. DE-AC05-00OR22725 to UT-Battelle, LLC, awarded by the United States Department of Energy. The Government has certain rights in the invention.

BACKGROUND OF THE INVENTION

Methane, the major constituent of natural gas, has a higher hydrogen/carbon ratio (H/C) than any other fuel and consequently a higher Research Octane No. than other fuels; 130 for natural gas compared to 87 for unleaded gasoline. Unfortunately, methane cannot be stored at a density as high as other fuels, and thus has an energy density approximately one-third that of gasoline; 11 MJ/L for compressed natural gas at 24.8 MPa (3600 psi) compared to 32 MJ/L for gasoline. Thus a compressed natural gas (CNG) fuel tank would need to be approximately three times larger than a gasoline tank to allow a vehicle the same driving range. The use of CNG has its disadvantages.

The CNG storage tanks must be pressure vessels and are thus constrained in their geometry, but are typically cylindrical. The tanks are also rather heavy, typically about 1 kg/L for steel tanks. Moreover, attainment of >20.7 MPa (3000 psi) pressure requires costly multi-stage compression.

For these reasons the US Department of Energy has pursued a research program aimed at the development of suitable materials for the storage of natural gas in the physically adsorbed state. Adsorbed natural gas (ANG) is conventionally stored in porous carbon materials at a gas pressure of 3.5 MPa (500 psi). This lower storage pressure reduces the cost of the storage vessel, allows the use of single stage compressors, and represents a lesser safety hazard than the higher pressures used for CNG. The DOE storage target for ANG has been set at 150 V/V, i.e., 150 liters of gas stored per liter of pressure vessel internal volume at standard temperature and pressure (STP=101.325 KPa, 298K).

The four issued U.S. patents below disclose a carbon with comparable storage densities to this invention. They disclose a method of manufacture and product for a wood derived porous carbon in powder form manufactured by chemical activation. They do not teach or disclose the monolith of this invention. U.S. Pat. No. 5,710,092 (Jan. 20, 1998); U.S. Pat. No. 5,416,056 (May 16, 1995); U.S. Pat. No. 5,626,637 (May 6, 1997); U.S. Pat. No. 5,965,483 (Oct. 12, 1999).

The following patents disclose powdered and granular carbons or molecular sieves capable of storing natural gas and methane. They do not teach an electrically conductive carbon fiber based monolith capable of electrical desorption, nor do they disclose enhanced thermal conductivity. U.S. Pat. No. 5,071,820 (Dec. 10, 1991); U.S. Pat. No. 5,094,736 (Mar. 10, 1992); U.S. Pat. No. 5,102,855 (Apr. 7, 1992); U.S. Pat. No. 5,372,619 (Dec. 13, 1994); U.S. Pat. No. 5,292,706 (Mar. 8, 1994); U.S. Pat. No. 5,292,707 (Mar. 8, 1994); U.S. Pat. No. 5,461,023 (Oct. 24, 1995); U.S. Pat. No. 5,614,460 (Mar. 25, 1997); U.S. Pat. No. 5,639,707 (Jun. 17, 1997); U.S. Pat. No. 5,837,741 (Nov. 17, 1998).

BRIEF SUMMARY OF THE INVENTION

The present invention is an adsorbent monolith based on carbon fibers that has improved methane gas storage capabilities. Additionally, the monolithic nature of the storage carbon allows it to exhibit greater thermal conductivity than conventional granular activated carbon or powdered activated carbon storage beds. The storage of methane gas is achieved through the process of physical adsorption in the micropores that are developed in the structure of the adsorbent monolith. The disclosed monolith is capable of storing greater than 150 V/V of methane [i.e., >150 STP (101.325 KPa, 298K) volumes of methane per unit volume of storage vessel internal volume] at a pressure of 3.5 MPa (500 psi). At storage capacities of >150 V/V, natural gas is competitive with compressed natural gas storage at a pressure of 24.8 MPa (3600 psi).

DETAILED DESCRIPTION

This adsorbent carbon monolith based on carbon fibers offers a solution to the limitations of conventional activated carbons for ANG applications. Because of its monolithic nature the material is abrasion resistant. Moreover, the continuous carbon skeleton allows for the liberation of practically all of the adsorbed gas via low-voltage electrical stimulation. Similarly, the continuous carbon skeleton of these monoliths offers enhanced thermal conductivity over packed beds of carbon. This translates to smaller temperature gradients during tank charging and discharging. The development of these novel storage monoliths has taken several years, but only recently have storage capacities in excess of the DOE target of 150 V/V been attained. With continued process development and materials optimization it is anticipated that storage capacities of >180 V/V (delivered) can be attained—giving approximately one-fourth the driving range of an equivalent volume gasoline tank. There have been various studies as to the theoretical maximum storage capacity that can be attained on an adsorbent carbon medium, as reviewed by Cook et al. Numbers as high as 243 V/V have been hypothesized, but the value of 220 V/V reported by Cook et al which was based on the calculations of Matranga, Myers and Glandt, and Tan and Gubbins is more plausible.

Figure 1:
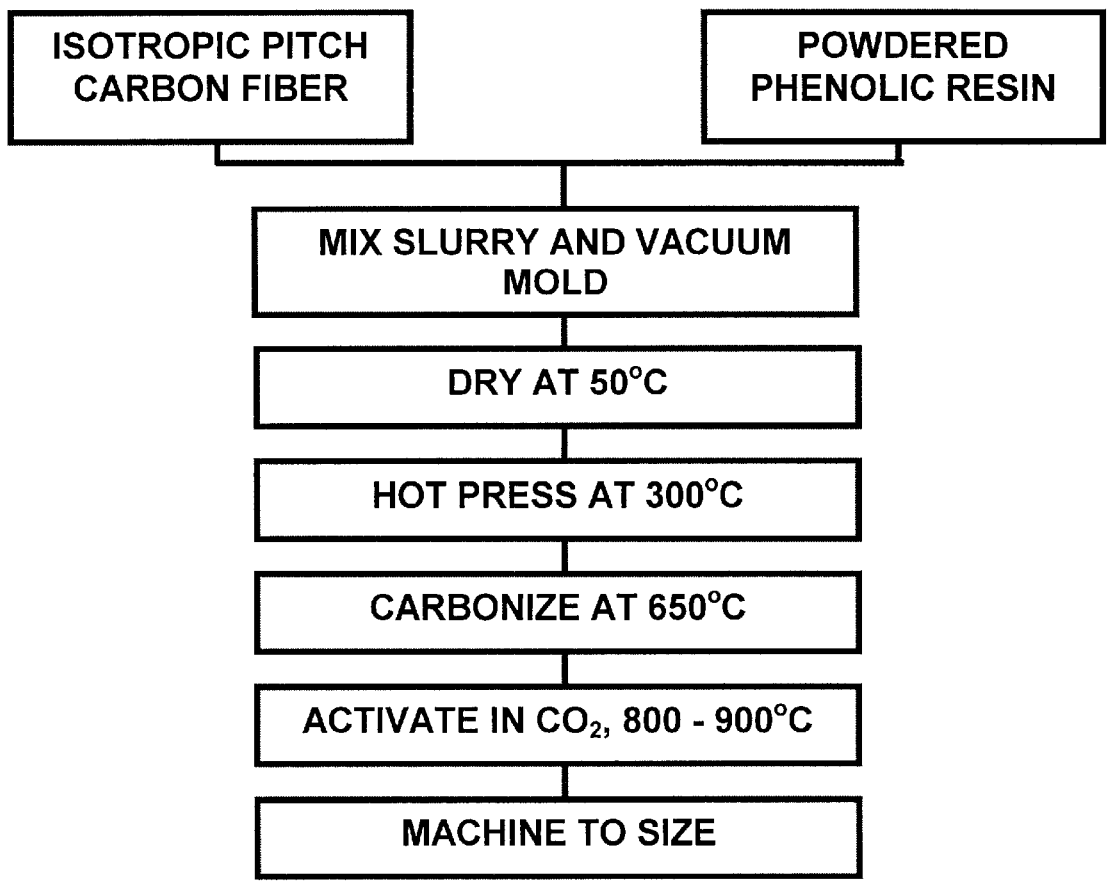
FIG. 1 is a schematic diagram of the fabrication of the storage monolith.

The gas storage monoliths of this invention were fabricated from isotropic pitch-derived carbon fibers (Carboflex fibers, Anshan East Asia Carbon Company, Anshan, China) and a powdered phenolic resin (Durez grade 7716, Occidental Chemical Corp., N. Tonanwanda, N.Y. 14120, USA). A schematic diagram of the fabrication route is in FIG. 1. The monoliths were hot-pressed using an applied load of approximately 58 kN (13,000 pounds), yielding a pressure in the hot press mold of approximately 5.5 MPa (800 psi), and carbonized in an inert gas atmosphere. Post carbonization densities were in the range 0.7–0.92 g/cm$^3$. Activation was performed in a $CO_2$ atmosphere to the desired burn-off. Post activation analysis of the monoliths included micropore characterization via $N_2$ adsorption at 77K, and bulk density determination by mensuration. Table 1 reports exact details of the fiber and resin mass used in the slurry molding operation, and the activation conditions used to prepare the monoliths disclosed here. The Carboflex fibers were used in the milled form, designated by the manufacturer as P-100, P-200, and P-400 fibers with mean lengths of 100, 200, and 400 μm, respectively. More details on the manufacturing process are found in U.S. Pat. No. 5,744,075, which issued on Apr. 28, 1998, and is herein incorporated by reference.

TABLE 1

Sample formulation and activation details for the storage monoliths disclosed here

| Sample | Mass of Fiber (g) P-100 | P-200 | P-400 | Mass of Resin (g) | Activation Temperature (°C.) | Activation Time (Hours) | Burn-off |
|---|---|---|---|---|---|---|---|
| SMS-15 | 109 | 0 | 134 | 120 | 850 | 96 | 55.2 |
| SMS-16 | 109 | 0 | 134 | 120 | 850 | 96 | 75.3 |
| SMS-17 | 80 | 160 | 0 | 120 | 850 | 96 | 51.9 |
| SMS-18 | 120 | 120 | 0 | 120 | 850 | 96 | 49.0 |
| SMS-19 | 240 | 0 | 0 | 120 | 850 | 96 | 55.9 |
| SMS-22 | 240 | 0 | 0 | 120 | 850 | 96 | 57.8 |
| SMS-23 | 240 | 0 | 0 | 120 | 850 | <96 | 31.8 |
| SMS-30 | 120 | 120 | 0 | 120 | 850 | >300 | 81.5 |

The standard monolith size was approximately 115 mm (4.5 inches) diameter and 38 mm (1.5 inches) thick. From this part a series of smaller samples [approximately 23 mm (0.9 inch) diameter] were machined for testing in a gravimetric apparatus. The test samples were stacked in the test cylinder to completely fill the 50-cm$^3$ test cylinder cavity. The storage samples were vacuum outgassed at 473K in the test cylinder, cooled to ambient temperature, and then slowly filled, near isothermally, to 3.5 MPa (500 psi) pressure. The storage capacity and carbon activity was then calculated from the cylinder's mass gain on charging. Testing was carried out in accordance with test procedure MET-CIMT-SOG-124 "Guideline for Methane Adsorption Capacity Determination", Mar. 22, 1999.

Figure 2:
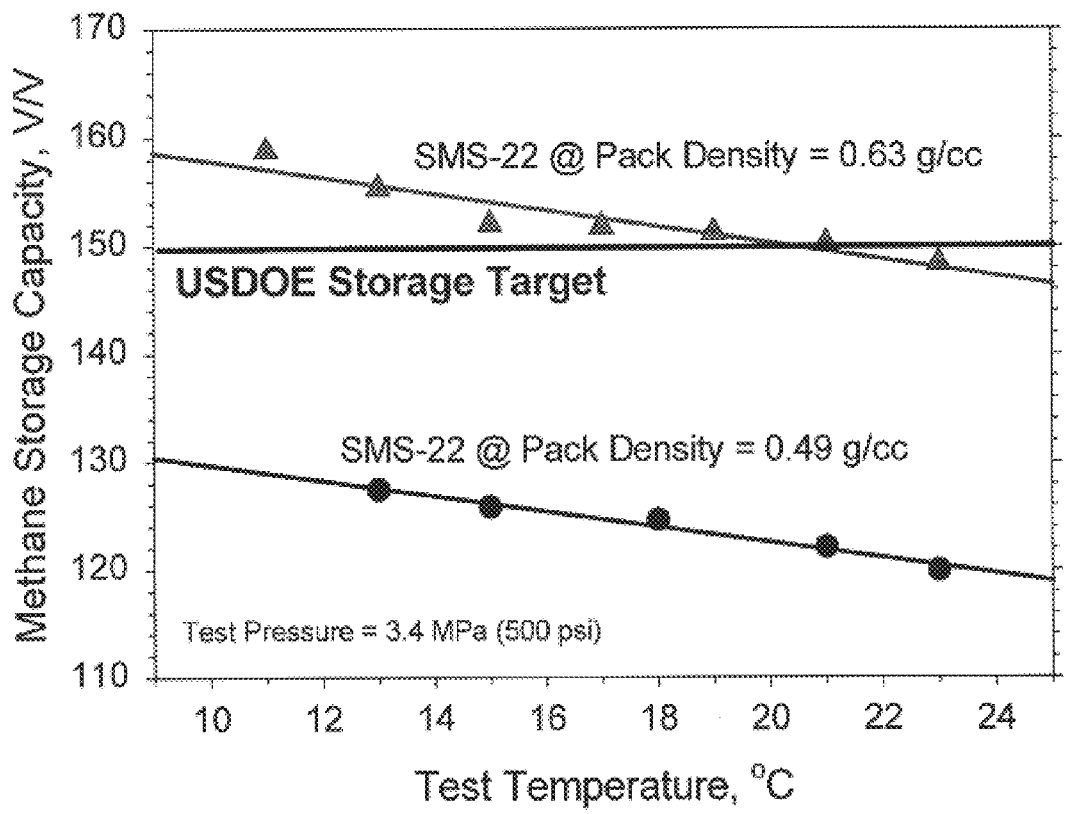
FIG. 2 is a graph of methane storage capacity vs. ambient temperature for the methane storage monoliths.

The results of the micropore characterization and gas storage studies for the monoliths disclosed in Table 1 are reported in Tables 2 and 3. A storage capacity of 150 V/V at 3.5 MPa (500 psi) and 294K was attained, which is comparable to the best commercially available gas storage carbons. The storage capacity is temperature sensitive. For example, the storage capacity of sample SMS-22 was 150 V/V at 294K, but increases to 159 V/V at 285K, as shown in FIG. 2.

Figure 3:
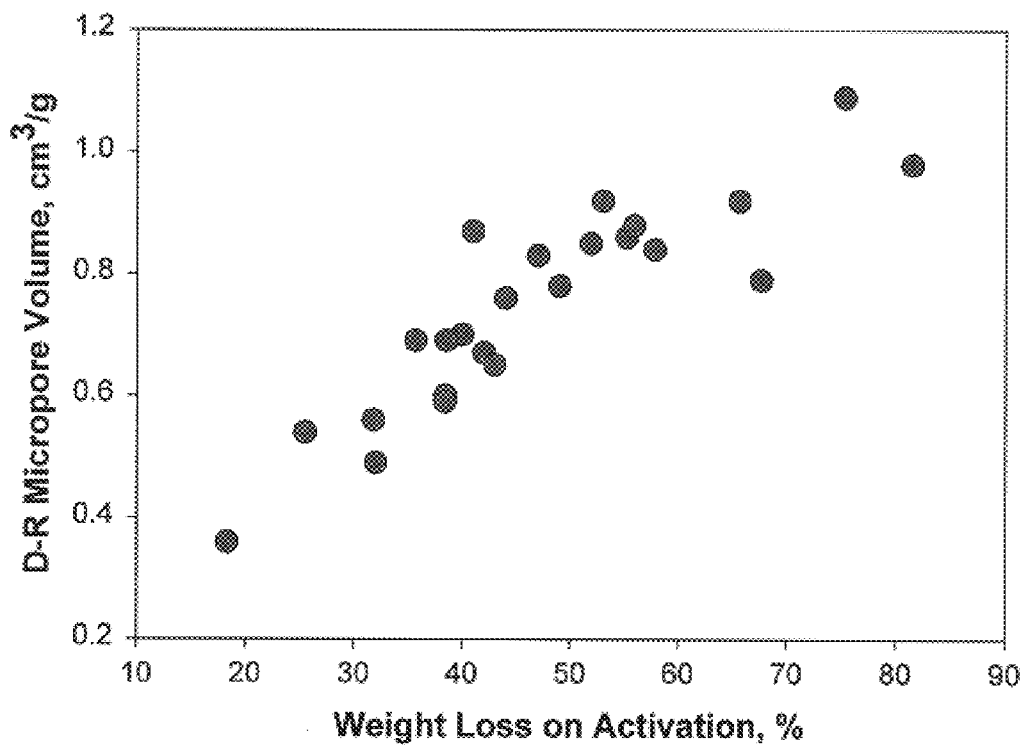
FIG. 3 is a plot showing micropore volume at various monolith burn-offs.
Figure 4:
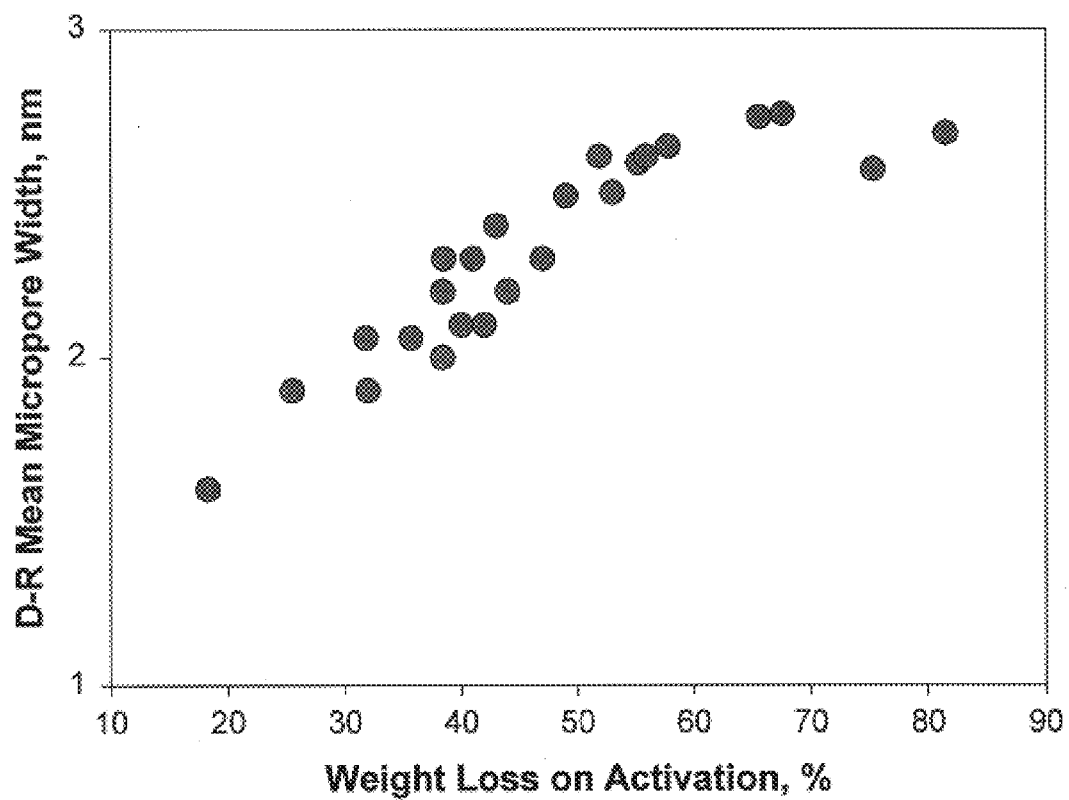
FIG. 4 is plot showing micropore widths at various monolith burn-offs.

Activation of the monoliths (burn-off) results in the development of microporosity, as indicated by the BET and micropore volume data in Table 1. Increasing the degree of burn-off increases the micropore volume and the mean micropore size, as shown in FIGS. 3 and 4. Although increased micropore volume is beneficial, since the gas is adsorbed into the micropores, it is so only to a point. At very large burn-off the density of the monolith is small, and the mean micropore size becomes large and far from the optimum value of 1.12 nm. Consequently, excessive burn-off is not productive.

Figure 5:
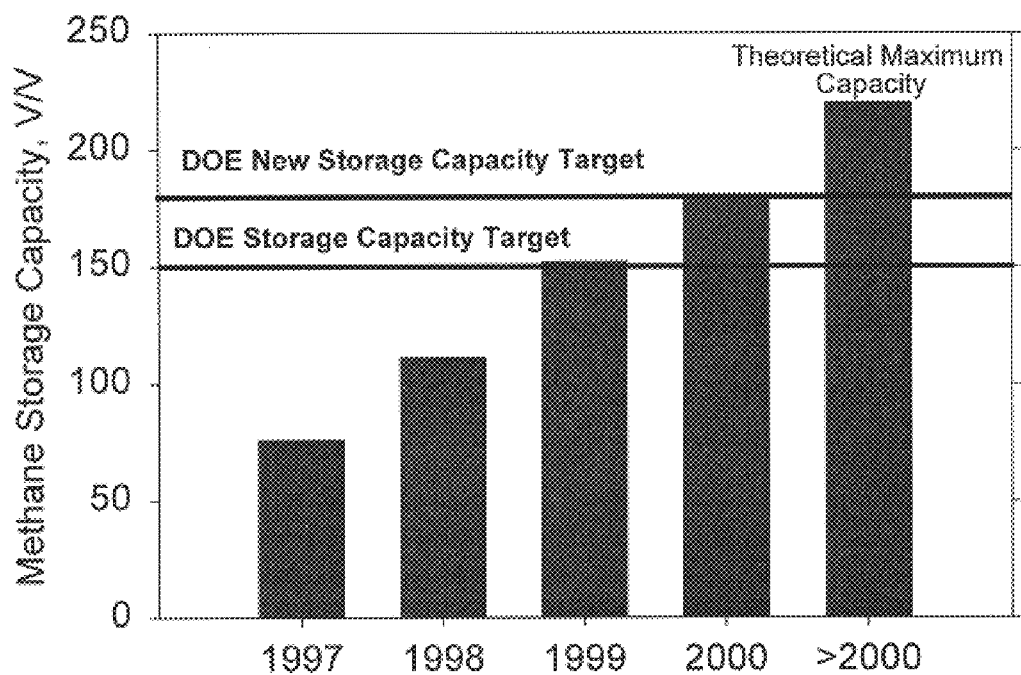
FIG. 5 is a bar graph of methane storage capacities for the 4 year monolith development period.

This point is illustrated by the data for samples SMS-23 and SMS-30, as seen in Table 3. In sample SMS-23, the density is large (0.70 g/cm$^3$) but the methane activity is rather low (8.3%) and the resultant capacity was only 112 V/V. In sample SMS-30, the activity was much greater (15.4%), but the density is extremely low (0.39 g/cm$^3$), and the resultant capacity is not greatly improved. The optimum storage monolith is, therefore, one which exhibits high methane activity (which is a function of micropore size and total micropore volume) and high density. Such a monolith would store as much as 180 V/V of methane at 3.5 MPa (500 psi)—the revised DOE target storage capacity. Indeed, a monolith that exhibited high density combined with a high volume of micropores, all of which were of the optimum size of 1.12 nm, would exhibit a storage capacity of 220 V/V. The attainment of a methane storage capacity of 180 V/V is particularly significant, since at that level comparable energy densities to compressed natural gas at 24.8 MPa (3600 psi) are achieved. The anticipated progress toward demonstrating a storage capacity of 180 V/V is shown in FIG. 5.

TABLE 2

Micropore characterization data for the methane storage monoliths

| Sample | Burn-off (%) | BET Area (m$^2$/g) | DR Micropore Volume (cm$^3$/g) | DR Micropore Width (nm) |
|---|---|---|---|---|
| SMS-15 | 55.2 | 2524 | 0.86 | 2.59 |
| SMS-16 | 75.3 | 3173 | 1.09 | 2.57 |
| SMS-17 | 51.9 | 2454 | 0.85 | 2.61 |
| SMS-18 | 49.0 | 2237 | 0.78 | 2.49 |
| SMS-19 | 55.9 | 2552 | 0.88 | 2.61 |
| SMS-22 | 57.8 | 2451 | 0.84 | 2.64 |
| SMS-23 | 31.8 | 1494 | 0.56 | 2.06 |
| SMS-30 | 81.5 | 2860 | 0.98 | 2.68 |

TABLE 3

Methane gas adsorption and storage data for the storage monoliths

| Sample | Cell Pack Density (g/cm$^3$) | Methane Activity (%) | Storage Capacity (V/V) |
|---|---|---|---|
| SMS-15 | 0.57 | 11.8 | 128 |
| SMS-16 | 0.48 | 11.6 | 111 |
| SMS-17 | 0.56 | 11.6 | 124 |
| SMS-18 | 0.53 | 11.4 | 118 |
| SMS-19 | 0.65 | 12.7 | 149 |
| SMS-22 | 0.63 | 13.2 | 150 |
| SMS-23 | 0.70 | 8.3 | 112 |
| SMS-30 | 0.39 | 15.4 | 120 |

Figure 6:
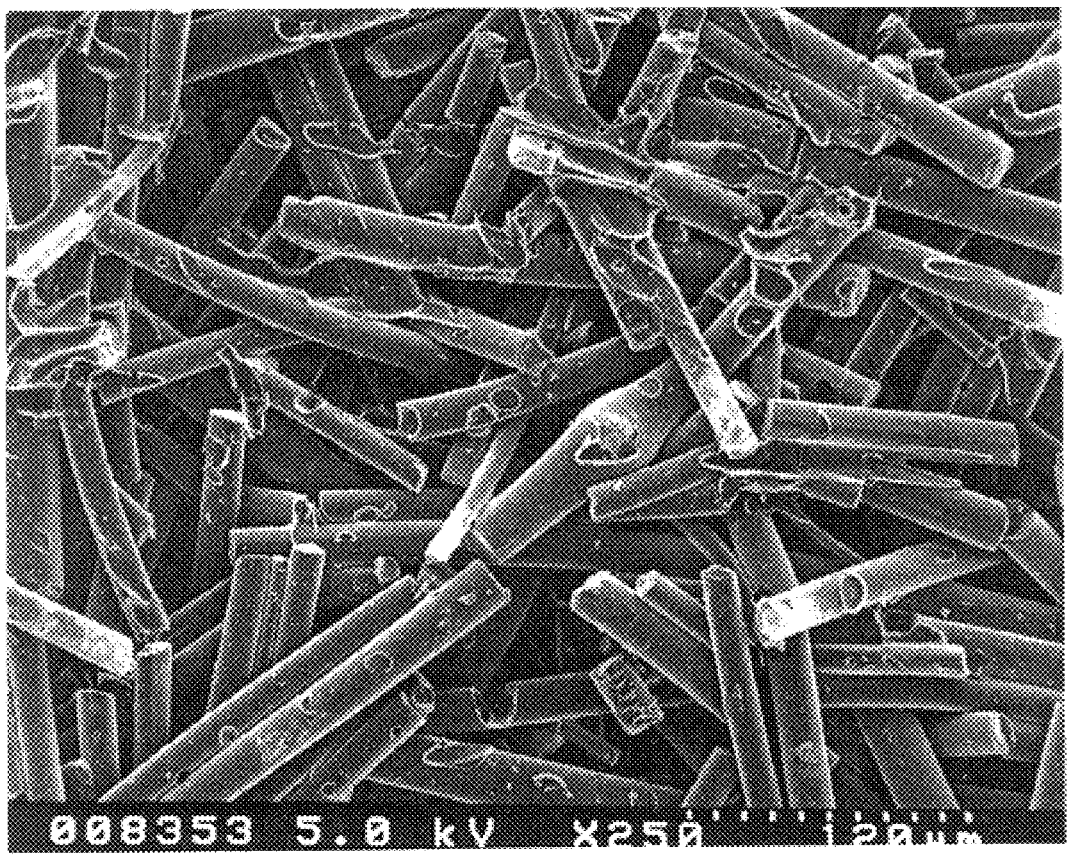
FIG. 6 is a photomicrograph of the storage monolith.

A unique feature of these monoliths is that the material exhibits a continuous carbon skeleton as shown in FIG. 6 and thus exhibits superior thermal conductivity and is electrically conductive. This latter phenomenon enables all of the adsorbed gas to be delivered by electrically stimulating desorption of the gas.

Figure 7:
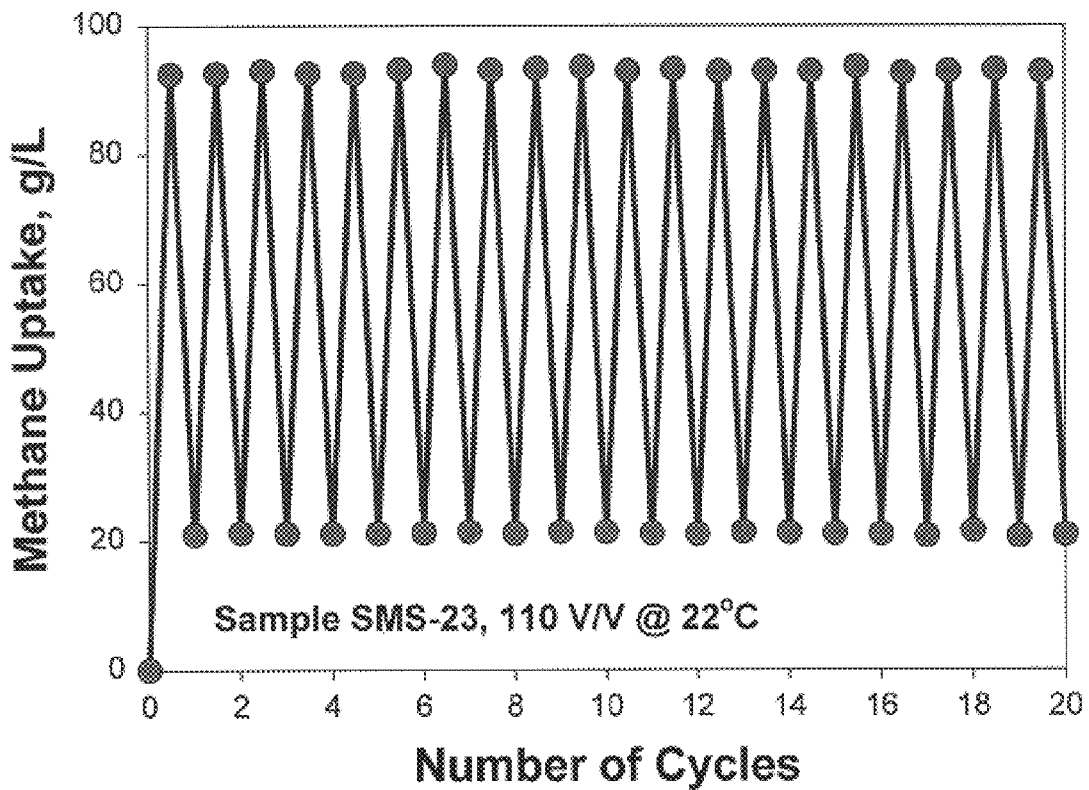
FIG. 7 is a graph of methane uptake over several cycles of charge and discharge.

Typically, 10–20% of the gas adsorbed into the monolith is retained when the gas pressure is reduced to one atmosphere. This is illustrated in FIG. 7, where the uptake of methane is shown for a repetitive charge/discharge cycle. In the first cycle the cylinder is charged from vacuum to 3.5 MPa (500 psi) under near isothermal conditions. When the gas is released and the pressure drops to atmospheric pressure some fraction of the adsorbed gas is retained in the carbon. As the data in FIG. 7 indicates, the amount of gas retained does not appear to increase as the adsorbent is cycled. However, the amount of delivered gas is less than the total amount stored. The use of electrical stimulation to desorb the adsorbed gas allows all of the adsorbed gas to be delivered, thus increasing the range of a vehicle fuelled from an adsorbed natural gas tank.

Figure 8:
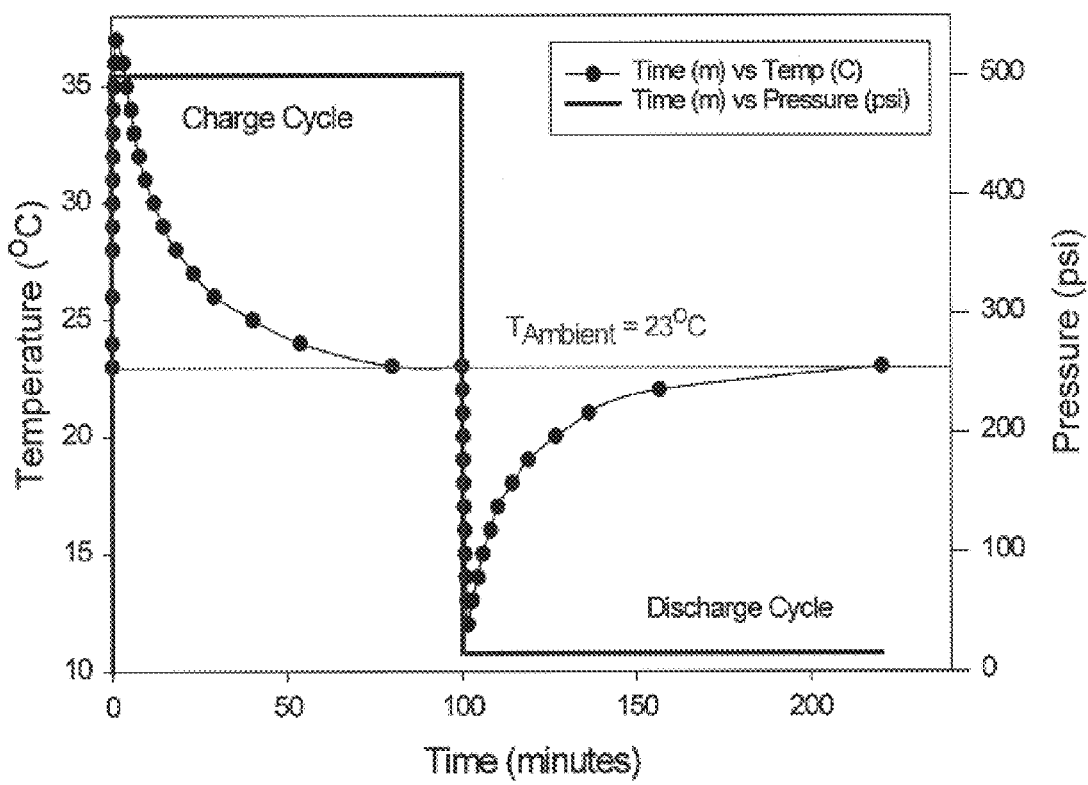
FIG. 8 is a graph of the test cylinder temperature during a fast fill/discharge cycle.

Enhanced thermal conductivity is also advantageous during rapid methane charge and discharge situations. Since the adsorption of methane onto activated carbon is an exothermic process, the adsorbent heats during adsorption. Similarly, desorption of methane is an endothermic process and, therefore, the adsorbent temperature drops as the gas is desorbed. The extent of these temperature changes is illustrated in FIG. 8 for a fast charge/discharge of the standard 50-cm$^3$ monolith filled test cylinder. These temperature changes have design implications and, therefore, minimizing the temperature changes is particularly important. The amount of gas adsorbed decreases as the temperature increases. Therefore, on filling, the capacity of the tank is diminished by the rise in adsorbent temperature and it is necessary to overpressurize the tank to achieve the desired storage capacity. When the adsorbent cools the gas pressure drops to the working pressure. Moreover, when the tank is discharged, the adsorbent temperature drops and the adsorbed gas is not released. Consequently, the gas pressure in the tank falls and the gas flow to the engine may be interrupted. Enhanced thermal conductivity will tend to reduce the significance of the two phenomena. Moreover, the ability to electrically stimulate desorption of the adsorbed gas offers the possibility of completely eliminating the gas pressure/supply problem associated with fast discharge.

The monolith material can be altered by blending the fibers (i.e. fibers of various lengths —see Table 1) and/or varying the processing conditions. In this manner, attaining a storage capacity of 180 V/V is achievable and the theoretical maximum capacity of 220 V/V is conceived.

The following publications and patents are herein incorporated by reference:

1) Cook, T. L., Komodromos, C., Quinn, D. F. and Ragan, S. Chapter 9, *Adsorbent Storage for Natural Gas Vehicles*, pp. 269–302. In *Carbon Materials for Advanced Technologies*, T. D. Burchell, Ed., Pub. 1999, Pergamon Press, Oxford, UK.

2) Matranga, K. R., Myers, A. L. and Glandt, E. D., *Chem Eng Science*, 1992,47, 1569.

3) Tan, Z. and Gubbins, K. E., *J. Phys Chem*. 1992, 96, 845–854.

4) Baker, F. S., U.S. Pat. No. 5,710,092 "Highly Microporous Carbon", Jan. 20, 1998.

5) Burchell, T. D., Judkins, R. R., Rogers, M. R., and Williams A. M., *CARBON* 1997, 35, 1279

6) Burchell, T. D. et al., U.S. Pat. No. 6,030,698 "Activated Carbon Fiber Composite Material And Method Of Making"

7) Judkins, R. R. et al., U.S. Pat. No. 5,912,424 "Electrical Swing Adsorption Gas Storage And Delivery System"

We claim:

1. A method of making a porous activated carbon fiber carbon matrix storage monolith comprising the steps of:
   Step 1. providing an aqueous slurry comprising carbon fibers and a carbonizable organic binder;
   Step 2. vacuum molding said slurry to form a monolith;
   Step 3. drying said monolith;
   Step 4. hot pressing said monolith;
   Step 5. carbonizing said monolith;
   Step 6. activating said monolith.

2. A method in accordance with claim 1 wherein said carbon fibers are made from a material selected from the group consisting of rayon, isotropic pitch, mesophase pitch, polyacrylonitrite and mixtures thereof.

3. A method in accordance with claim 1 wherein said carbon fibers are comminuted by a process selected from the group consisting of chopping, milling, and combinations thereof.

4. A method in accordance with claim 1 wherein said carbon fibers have a length of about 100 $\mu$m to about 400 $\mu$m and an aspect ratio equal to or greater than 20:1.

5. A method in accordance with claim 1 wherein said carbon fibers are chopped carbon fibers having a length of about 1 mm to about 10 mm and a diameter from about 6 $\mu$m to about 16 $\mu$m.

6. A method in accordance with claim 1 wherein said carbon fibers are milled carbon fibers having a mean length greater than about 100 $\mu$m and less than about 400 $\mu$m and a diameter from about 6 $\mu$m to about 16 $\mu$m.

7. A method in accordance with claim 1 wherein said carbon fibers have a length equal to or less than 10 mm.

8. A method in accordance with claim 1 wherein said carbonizable organic binder is selected from the group consisting of powdered isotropic pitch, a phenolic resin, and mixtures thereof.

9. A method in accordance with claim 1 wherein said drying step comprises heating said monolith to a temperature in the range of approximately 60° C. to 100° C. for a period of time in the range of approximately 2 to 14 hours.

10. A method in accordance with claim 1 wherein said hot pressing comprises pressing said monolith in a matched mold at a mold pressure of at least approximately 800 psi and at a temperature of approximately 300° C. for a period of time in the range of approximately 0.5 to 5 hours.

11. A method in accordance with claim 1 wherein said carbonizing is done under a nitrogen atmosphere.

12. A method in accordance with claim 1 wherein said carbonizing is done under a nitrogen atmosphere for approximately 3 hours at a temperature in the range of 600° to 700° C.

13. A method in accordance with claim 1 wherein said activation step is done under a carbon dioxide atmosphere.

14. A method in accordance with claim 1 wherein said activation is done under a carbon dioxide atmosphere at a temperature in the range of 800° to 900° C.

15. A method in accordance with claim 1 wherein said monolith has a cell pack density in the range of 0.39–0.70 g/cc.

16. A method in accordance with claim 1 wherein said monolith has a gas storage capacity of at least approximately 76 V/V.

* * * * *